US010480453B2

(12) United States Patent
Sawyers-Abbott et al.

(10) Patent No.: US 10,480,453 B2
(45) Date of Patent: Nov. 19, 2019

(54) HIDDEN THRUST REVERSER BLOCKER DOOR LINK ARM FITTING (71) Applicant: United Technologies Corporation, Farmington, CT (US)

(72) Inventors: Nigel David Sawyers-Abbott, South Glastonbury, CT (US); Matthew Exner, East Hampton, CT (US)

(73) Assignee: United Technologies Corporation, Farmington, CT (US)

(*) Notice: Subject to any disclaimer, the term of this patent is extended or adjusted under 35 U.S.C. 154(b) by 445 days.

(21) Appl. No.: 15/258,820

(22) Filed: Sep. 7, 2016

(65) Prior Publication Data
US 2018/0066607 A1 Mar. 8, 2018

(51) Int. Cl.
F02K 1/76 (2006.01)
F02K 1/72 (2006.01)
F01D 25/24 (2006.01)
F01D 25/28 (2006.01)
F16C 11/04 (2006.01)

(52) U.S. Cl.
CPC .............. F02K 1/763 (2013.01); F01D 25/24 (2013.01); F01D 25/28 (2013.01); F02K 1/72 (2013.01); F05D 2220/32 (2013.01); F05D 2230/60 (2013.01); F05D 2260/50 (2013.01); F16C 11/045 (2013.01); F16C 2360/23 (2013.01); Y02T 50/672 (2013.01)

(58) Field of Classification Search
CPC ... F02K 1/80; F02K 1/72; F02K 1/763; F02K 1/62; F02K 1/625; F05D 2260/56; F05D 2260/50; F05D 2230/64
See application file for complete search history.

(56) References Cited

U.S. PATENT DOCUMENTS

| 4,605,186 | A |  | 8/1986 | Fernz |  |
|---|---|---|---|---|---|
| 5,058,828 | A | * | 10/1991 | Pillari | B64D 33/04 239/265.29 |
| 6,032,901 | A | * | 3/2000 | Carimali | B64D 29/06 244/129.4 |
| 9,714,612 | B2 |  | 7/2017 | Lacko |  |

(Continued)

FOREIGN PATENT DOCUMENTS

| EP | 2243945 | 10/2010 |
|---|---|---|
| EP | 3156634 | 10/2010 |

OTHER PUBLICATIONS

European Patent Office, European Search Report dated Jan. 25, 2018 in Application No. 17188628.6-1007.

(Continued)

Primary Examiner — Andrew H Nguyen
(74) Attorney, Agent, or Firm — Snell & Wilmer, L.L.P.

(57) ABSTRACT

A linkage system for a nacelle may comprise a pivot configured to extend through a second aperture disposed in a link arm, a retaining member having a first end and a second end and defining a first aperture and a cavity, wherein the pivot is configured to extend at least partially into the first aperture and the cavity is configured to accommodate a portion of the link arm, and wherein the retaining member comprises an attachment aperture located at the first end and a lip extending from the retaining member at the second end, the attachment aperture configured to receive a fastener and the lip configured to be placed under a distal layer of an inner fixed structure (IFS).

16 Claims, 11 Drawing Sheets (56) References Cited

U.S. PATENT DOCUMENTS

| | | | |
|---|---|---|---|
| 2010/0270428 A1 | 10/2010 | Murphey | |
| 2013/0062434 A1* | 3/2013 | Vauchel | B64D 29/06 239/265.19 |
| 2013/0219857 A1 | 8/2013 | Zysman | |
| 2015/0308381 A1* | 10/2015 | Byrne | F02K 1/763 60/226.2 |
| 2016/0090868 A1* | 3/2016 | Brain | B64D 27/26 403/156 |
| 2018/0065754 A1 | 3/2018 | Sawyers-Abbott | |
| 2018/0066607 A1 | 3/2018 | Sawyers-Abbott | |

OTHER PUBLICATIONS

European Patent Office, European Search Report dated Jan. 24, 2018 in Application No. 1788437.2-1007.
U.S. Appl. No. 15/131,933, filed Apr. 18, 2016, Nigel David Sawyers-Abbott.
U.S. Appl. No. 15/131,955, filed Apr. 18, 2016, Nigel David Sawyers-Abbott.
Sawyers-Abbott, U.S. Appl. No. 15/258,927, filed Sep. 7, 2016 and entitled Hidden Thrust Reverser Blocker Door Link Arm Fitting.
USPTO, Non-Final Office Action dated Nov. 29, 2018 in U.S. Appl. No. 15/258,927.
USPTO, Notice of Allowance dated Apr. 15, 2019 in U.S. Appl. No. 15/258,927.

\* cited by examiner

HIDDEN THRUST REVERSER BLOCKER DOOR LINK ARM FITTING

FIELD

This disclosure relates generally to gas turbine engines, and more particularly to thrust reverser assemblies for gas turbine engines.

BACKGROUND

Generally, a thrust reverser blocker door link arm attaches to a fan duct inner fixed structure (IFS) via a fitting attached to the surface of the IFS. The thrust reverser blocker door may rotate about the fitting to a deployed position, blocking fan duct air and causing reverse thrust. These features (i.e., the fitting and the link arm) may cause duct losses and may reduce thrust specific fuel consumption (TSFC).

SUMMARY

A linkage system for a nacelle may comprise a pivot configured to extend through a second aperture disposed in a link arm, a retaining member having a first end and a second end and defining a first aperture and a cavity, wherein the pivot is configured to extend at least partially into the first aperture and the cavity is configured to accommodate a portion of the link arm, and wherein the retaining member comprises an attachment aperture located at the first end and a lip extending from the retaining member at the second end, the attachment aperture configured to receive a fastener and the lip configured to be placed under a distal layer of an inner fixed structure (IFS).

In various embodiments, the first end of the retaining member may be configured to be attached to the IFS via the attachment aperture. The lip may be configured to prevent the second end of the retaining member from moving relative to the IFS. The linkage system may further comprise the fastener, the attachment aperture being configured to receive the fastener. The first aperture may extend in a direction substantially orthogonal to the cavity. The retaining member may be configured to retain the link arm to the IFS. The attachment aperture may extend substantially orthogonal to the first aperture. The cavity may comprise a high aspect ratio aperture. The linkage system may further comprise a housing configured to encase a portion of the retaining member, the housing being coupled to the IFS and comprising the fastener extending from the housing, the attachment aperture configured to receive the fastener.

A nacelle for a gas turbine engine may comprise an inner fixed structure (IFS) comprising a proximal layer and a distal layer, a link arm having a first end and a second end, wherein a second aperture is disposed in the link arm at the first end, the link arm configured to rotate about the second aperture, and a fitting for the link arm. The fitting for the link arm may comprise a pivot extending through the second aperture, a retaining member having a first end and a second end and defining a first aperture and a cavity, wherein the pivot extends at least partially into the first aperture and at least a portion of the first end of the link arm is located within the cavity, wherein the retaining member comprises an attachment aperture located at the first end of the retaining member and a lip extending from the retaining member at the second end of the retaining member, the attachment aperture configured to receive a fastener and the lip located under the distal layer of the IFS, and wherein the retaining member is disposed at least one of radially inward of the distal layer or flush with the distal layer.

In various embodiments, the first end of the retaining member may be attached to the IFS via the attachment aperture. The lip may prevent the second end of the retaining member from moving relative to the IFS. The fitting may further comprise the fastener, the fastener being located at least partially within the attachment aperture. The first aperture may extend in a direction substantially orthogonal to the cavity. The retaining member may retain the link arm to the IFS. The attachment aperture may extend substantially orthogonal to the first aperture. The cavity may comprise a high aspect ratio aperture. The nacelle may further comprise a housing encasing a portion of the retaining member, the housing coupled to the IFS and comprising the fastener extending from the housing, the fastener extending through the attachment aperture.

A method of installing a linkage system to a nacelle may comprise placing a pivot at least partially into a first aperture disposed in a retaining member, positioning the first aperture and a second aperture disposed in a thrust reverser link arm in concentric alignment, placing the pivot at least partially into the second aperture of the thrust reverser link arm, placing a lip underneath a distal layer of an inner fixed structure (IFS), the lip extending from the retaining member, the retaining member defining at least a portion of the first aperture and defining at least a portion of a cavity, at least a portion of the link arm being located within the cavity, and placing a fastening aperture disposed in the retaining member to surround a fastener, the fastener being coupled to the IFS, wherein the method is performed from a bypass flow path of the nacelle.

The method may further comprise fastening the retaining member to the fastener via a nut, wherein the nut is located radially inwards from a distal surface of the distal layer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
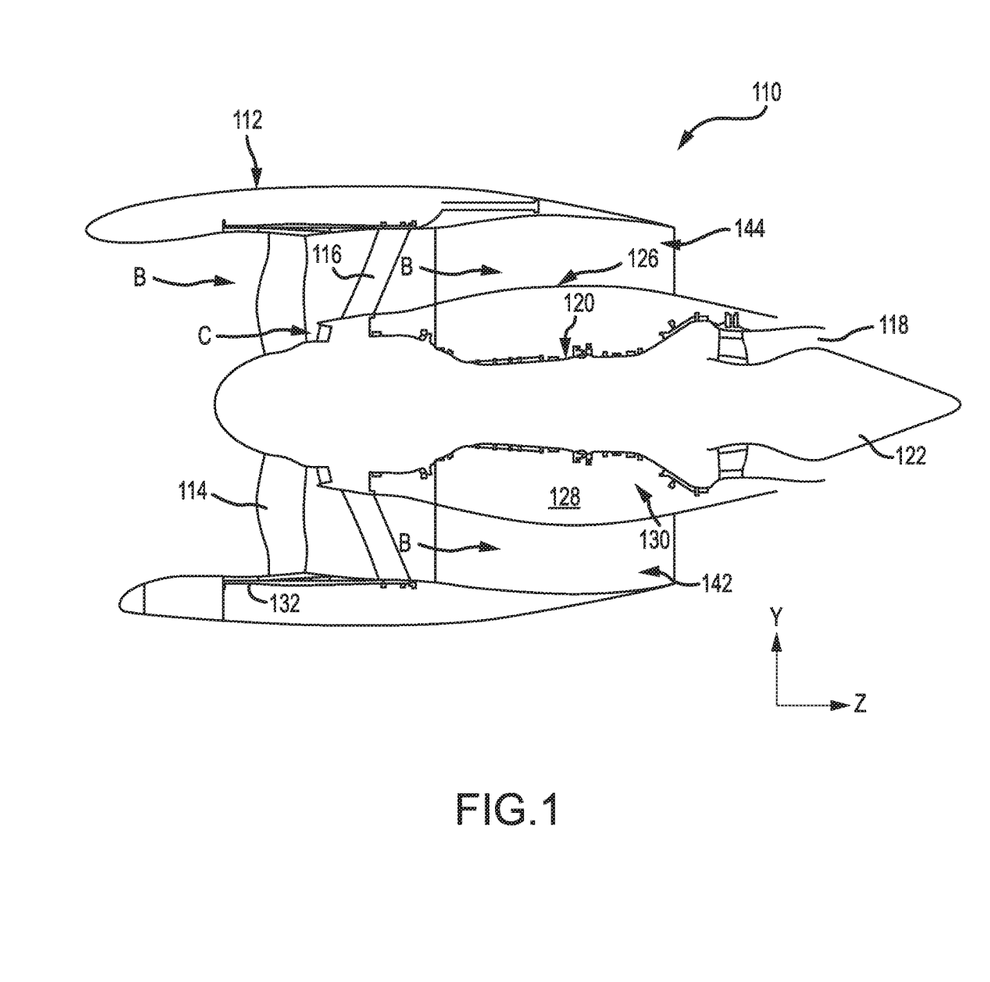
FIG. 1 illustrates a gas turbine engine, in accordance with various embodiments.

FIG. 1 illustrates a schematic view of a gas turbine engine, in accordance with various embodiments. An xyz-axis is provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Nacelle 112 typically comprises two halves which are typically mounted to a pylon. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example.

Figure 2A:
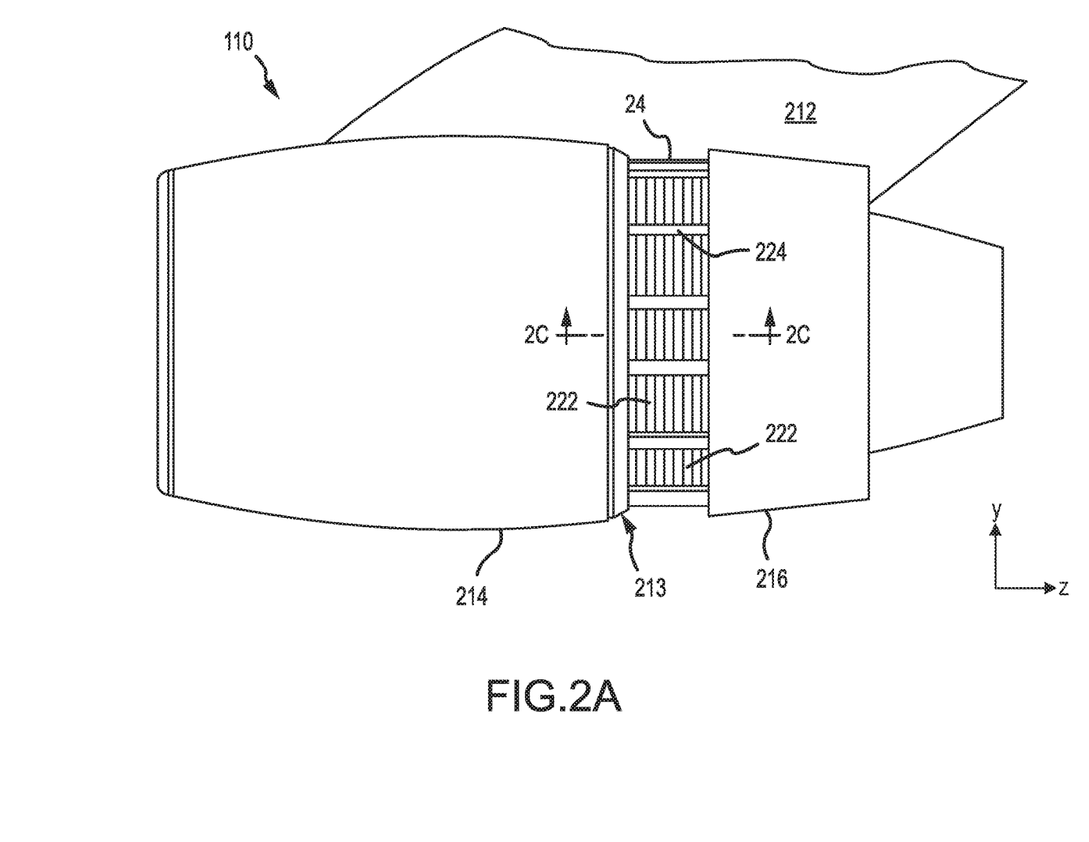
FIG. 2A illustrates a side view of a gas turbine engine, in accordance with various embodiments.

With reference to FIG. 2A, a side view of gas turbine engine 110 is illustrated, in accordance with various embodiments. Gas turbine engine 110 may comprise a turbofan engine. Gas turbine engine 110 may be mounted onto an aircraft by pylon 212. Gas turbine engine 110 may include segmented cowl 213 which includes nacelle body 214 and translating cowl 216 and IFS 126 (see FIG. 1). Translating cowl 216 is split from nacelle body 214 and translates aft to produce reverse thrust.

A plurality of cascade vane sets 222 may be uncovered in response to translating cowl 216 being translated aft as seen in FIG. 2A. Each of cascade vane sets 222 may include a plurality of conventional transverse, curved, turning vanes which turn airflow passing out from bypass flow path B (see FIG. 1) through the cascade sets in an outwardly and forwardly direction relative to gas turbine engine 110. Islands 224 are provided between cascade vane sets 222 to support the translation of translating cowl 216 and support the sides of cascade vane sets 222. In the stowed position, translating cowl 216 is translated forwardly to cover cascade vane sets 222 and provide a smooth, streamlined surface for air flow during normal flight operations.

Figure 2B:
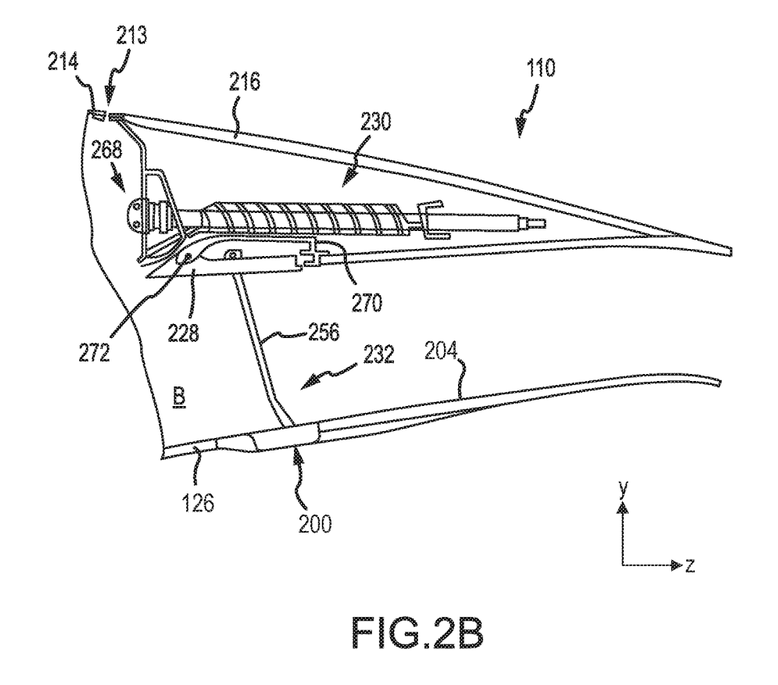
FIG. 2B illustrates a cross-section view of gas turbine engine with a blocker door in a stowed position, in accordance with various embodiments.

With reference to FIG. 2B, a cross-section view of gas turbine engine 110 with blocker door 228 in a stowed position is illustrated, in accordance with various embodiments. Cascade 230 shown in FIG. 2B is just one of many cascade vane sets 222 disposed circumferentially around gas turbine engine 110 as shown in FIG. 2A. An actuator 268 may be disposed between these sets of cascades in order to drive translating cowl 216 aftward. After a thrust reversing operation is completed, actuators 268 may return blocker door 228 to the stowed position. Actuator 268 can be a ball-screw actuator, hydraulic actuator, or any other actuator known in the art. In various embodiments, multiple actuators 268 are spaced around gas turbine engine 110 in between cascade vane sets 222. Although illustrated in FIG. 2B and FIG. 2C as being radially in-line with cascade 230, actuator 268 may be located radially inward, radially outward, or in any location relative to cascade 230.

Blocker door (also referred to herein as thrust reverser blocker door) 228 may be engaged with translating cowl 216. In various embodiments, blocker door 228 may be engaged with translating cowl 216 through bracket 270. In various embodiments, bracket 270 and translating cowl 216 may comprise a single, unitary member. Pivot 272 may be a hinge attachment between blocker door 228 and bracket 270. In various embodiments, blocker door 228 may be engaged directly to translating cowl 216 through a hinge attachment. Pivot 272 may allow blocker door 228 to rotate as translating cowl 216 moves from a stowed position to a deployed position.

Figure 2C:
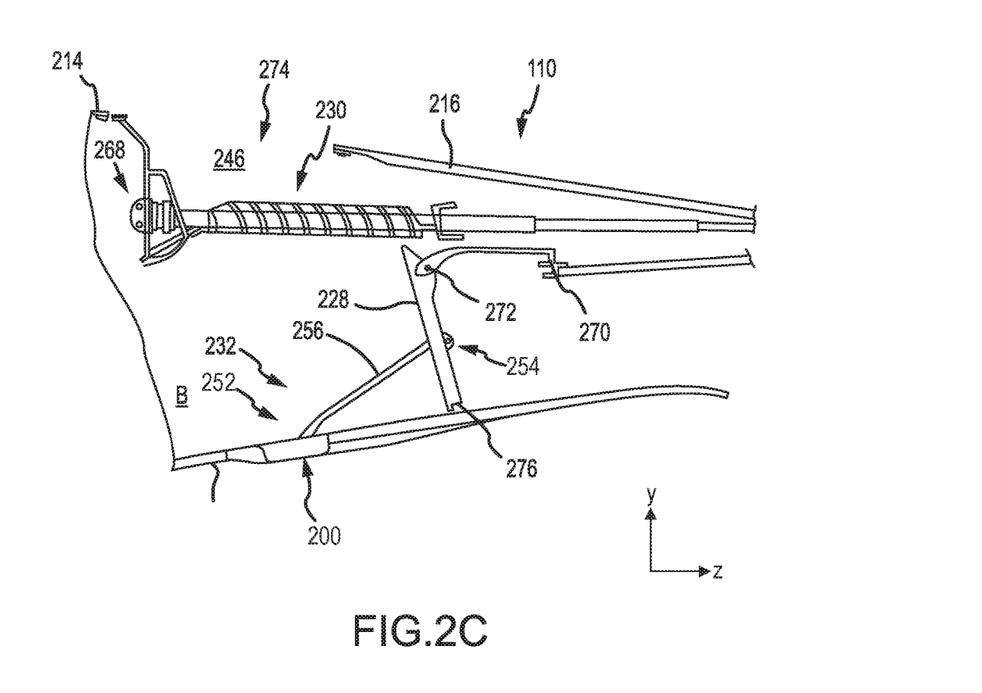
FIG. 2C illustrates a cross-section view of gas turbine engine with a blocker door in a deployed position, in accordance with various embodiments.

With combined reference to FIG. 2B and FIG. 2C, a linkage system 232 may be coupled between IFS 126 and blocker door 228. Linkage system 232 may include fitting arrangement (also referred to herein as fitting) 200 and link arm (also referred to herein as a thrust reverser link arm) 256. Fitting 200 may be coupled to IFS 126. Link arm 256 may be configured to pivot about fitting 200. Stated another way, first end 252 of link arm 256 may be rotatably coupled to fitting 200. Second end 254 of link arm 256 may be rotatably coupled to blocker door 228.

Fitting 200 may extend through an aperture disposed in IFS 126 such that fitting 200 does not extend into bypass flow-path B, allowing a more efficient flow of bypass air in bypass flow-path B. Stated another way, fitting 200 may be located such that fitting 200 does not extend radially outward of distal surface (also referred to herein as flow surface) 204 of IFS 126. Distal surface 204 may partially define bypass flow path B. In this manner, the thrust specific fuel consumption (TSFC) of the gas turbine engine onto which fitting 200 is installed may be increased, in accordance with various embodiments.

With respect to FIG. 2C, elements with like element numbering, as depicted in FIG. 2B, are intended to be the same and will not necessarily be repeated for the sake of clarity.

With reference to FIG. 2C, a cross-section view of gas turbine engine 110 with blocker door 228 in a deployed position is illustrated, in accordance with various embodiments. Thus, FIG. 2C shows gas turbine engine 110 in a reverse thrust mode. Blocker door 228 and its associated linkage system 232 are responsive to translation of translating cowl 216 during a thrust reversing sequence. As noted above and with momentary additional reference to FIG. 1, FIG. 2B shows a normal or cruise mode where fan air is directed through bypass flow path B. When in reverse thrust mode or deployed position, shown in FIG. 2C, bypass flow path B is blocked by one or more circumferentially disposed blocker doors 228, interposed within bypass flow path B and collectively having a complementary geometric configuration respect thereto, for diversion of fan air into bypass duct 246. The reverse thrust mode is achieved by aftward movement of translating cowl 216, thereby exposing outlet port 274 for airflow to escape through after the air passes into bypass duct 246.

Figure 2D:
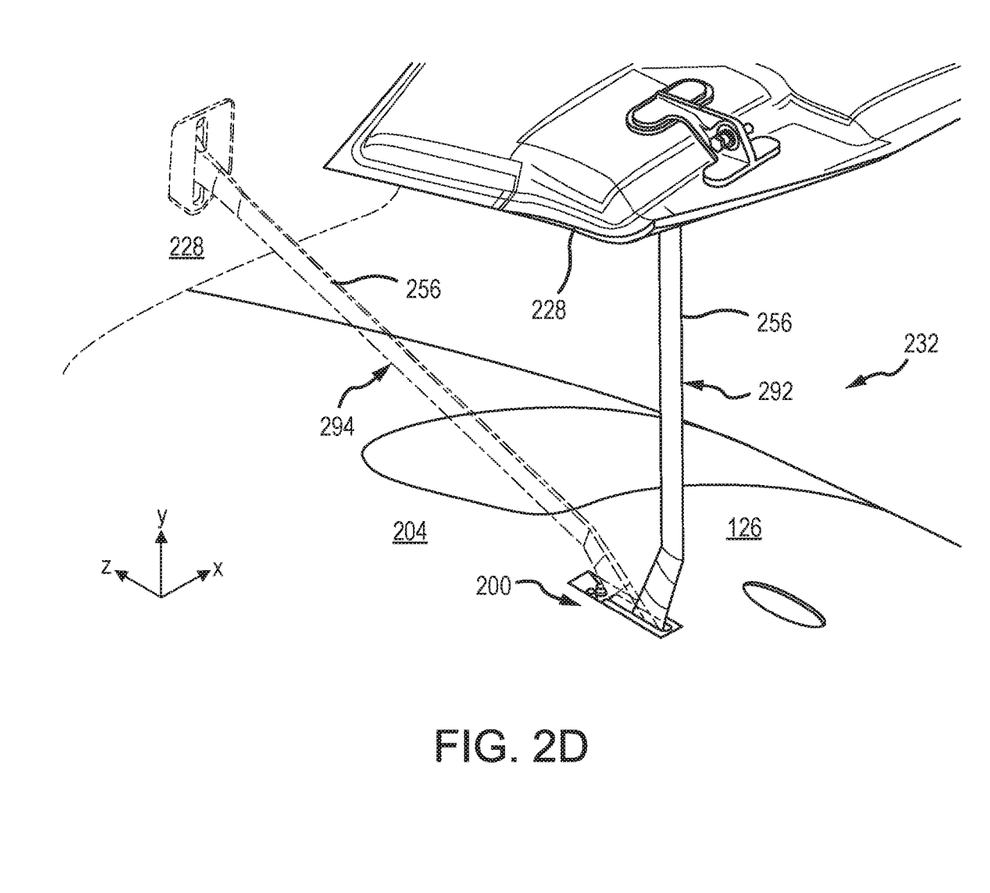
FIG. 2D illustrates a perspective view of gas turbine engine with a blocker door in both the deployed position and the stowed position, in accordance with various embodiments.

With respect to FIG. 2D, elements with like element numbering, as depicted in FIG. 2B and FIG. 2C, are intended to be the same and will not necessarily be repeated for the sake of clarity.

With reference to FIG. 2D, a perspective view of link arm 256 in the stowed position (also referred to as a normal cruise mode) 292 and the deployed position (also referred to as a reverse thrust mode) 294 is illustrated, in accordance with various embodiments. Stated another way, a perspective view of blocker door 228 in the stowed position 292 and the deployed position 294 is illustrated, in accordance with various embodiments. In various embodiments, fitting 200 may be flush with distal surface 204 when fitting 200 is in the installed position as illustrated in FIG. 2D. In various embodiments, fitting 200 may be disposed radially inward of distal surface 204 when fitting 200 is in the installed position as illustrated in FIG. 2D.

Figure 3A:
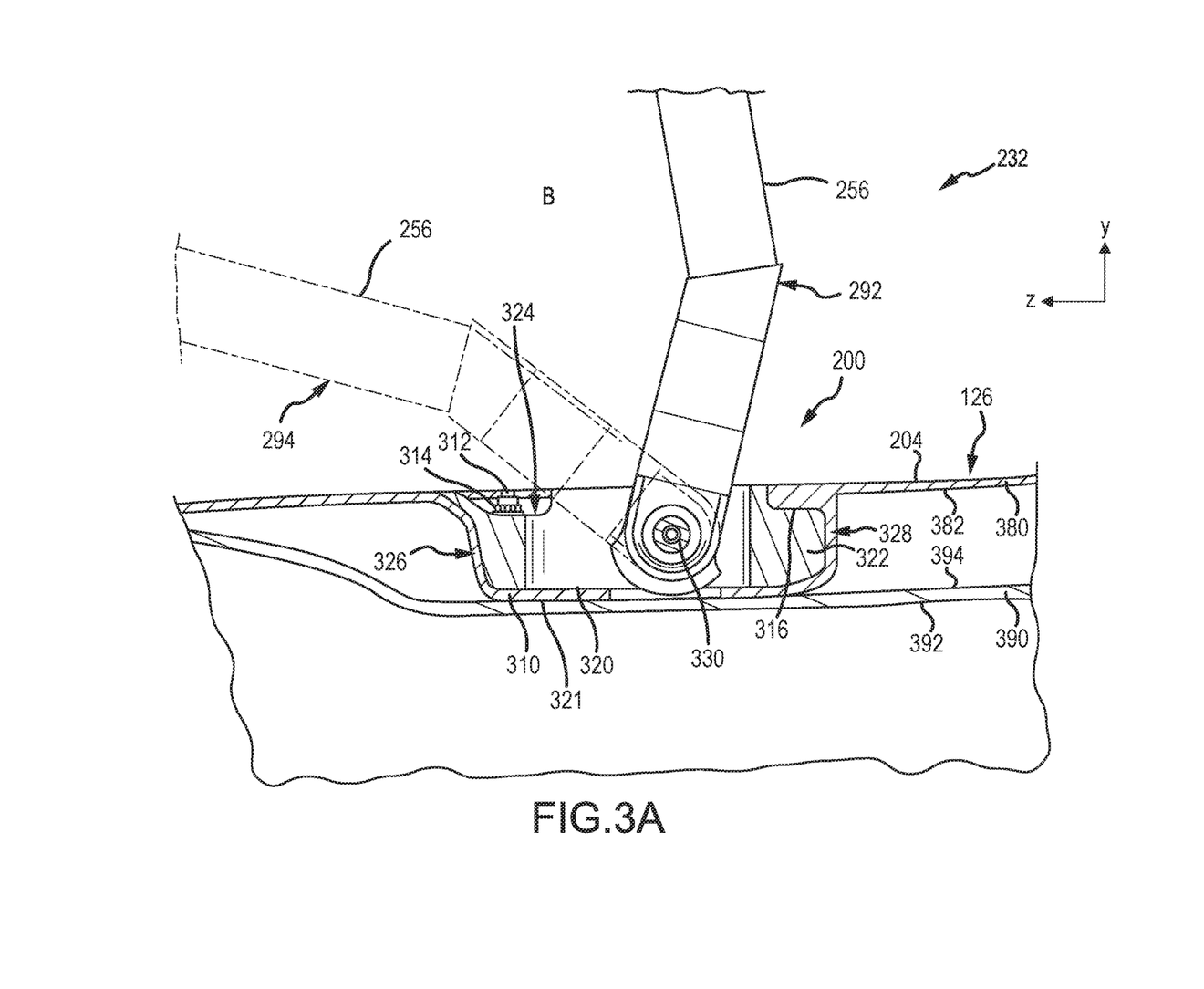
FIG. 3A illustrates a side, cross-sectional view of a fitting coupled to a link in both the normal cruise mode and the reverse thrust mode, in accordance with various embodiments.
Figure 3B:
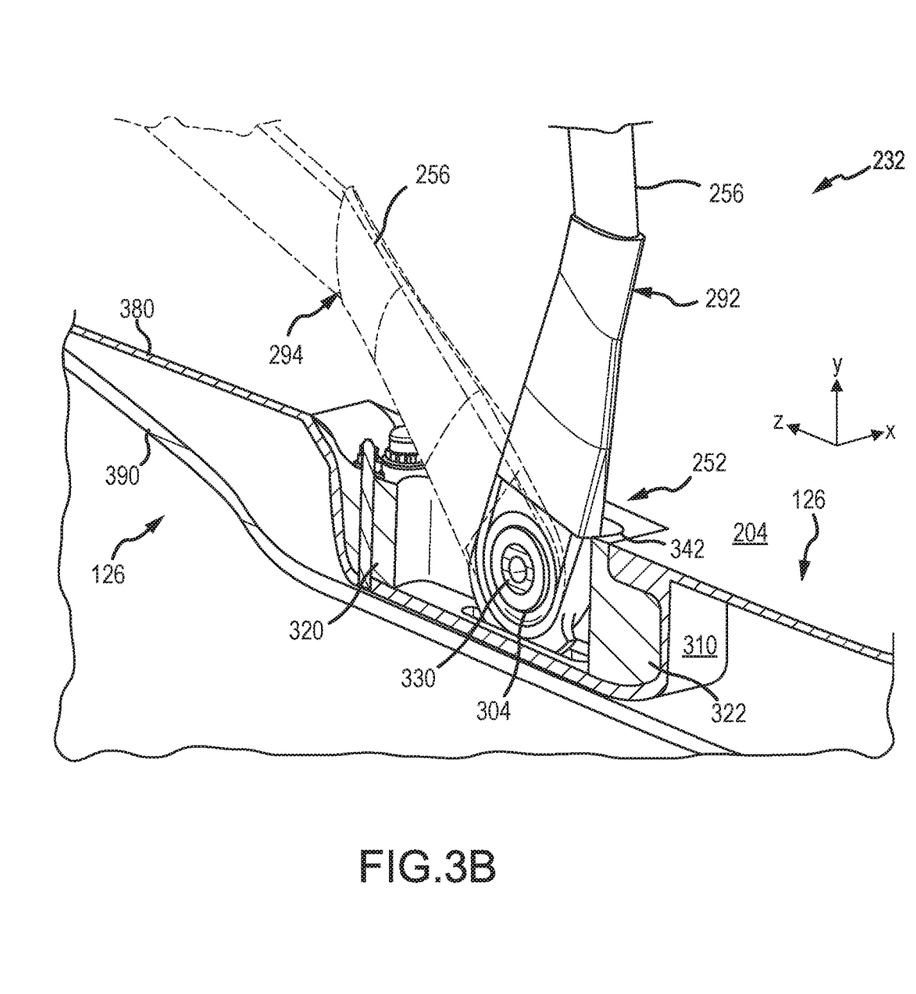
FIG. 3B, illustrates a perspective, cross-sectional view of a fitting coupled to a link in both the normal cruise mode and the reverse thrust mode, in accordance with various embodiments.

With respect to FIG. 3A and FIG. 3B, elements with like element numbering, as depicted in FIG. 2B and FIG. 2C, are intended to be the same and will not necessarily be repeated for the sake of clarity.

With reference to FIG. 3A, a close-up, cross-sectional view of linkage system 232 in a deployed position 294 as well as in a stowed position 292 is illustrated, in accordance with various embodiments. A yz-axes is provided for ease of illustration. Fitting 200 may be coupled to IFS 126. IFS 126 may comprise a distal layer 380 and a proximal layer 390.

In various embodiments, distal layer 380 may comprise a composite sheet or may comprise a metallic sheet. In various embodiments, proximal layer 390 may comprise a composite sheet or may comprise a metallic sheet. Distal layer 380 may comprise a distal surface 204 and a proximal surface 382. Proximal layer 390 may comprise a distal surface 394 and a proximal surface 392.

In various embodiments, fitting 200 may include pivot 330 and retaining member 320. Retaining member 320 may include first end 326 and second end 328. Retaining member 320 may include lip 322 extending from retaining member 320 at second end 328. Lip 322 may extend in a direction substantially parallel to the centerline axis of gas turbine engine 110 (see FIG. 1). Lip 322 may extend in a direction substantially parallel to proximal surface 382 of IFS 126.

In various embodiments, linkage system 232 may include housing 310, fastener 312 and nut 314. In various embodiments, housing 310 may be formed integrally with IFS 126. In this regard, lip 322 may contact proximal surface 382 of IFS 126. Lip 322 may prevent second end 328 of retaining member 320 from moving relative to IFS 126. In various embodiments, housing 310 may be formed separately from IFS 126. In this regard, lip 322 may contact proximal surface 316 of housing 310. In various embodiments, housing 310 may be coupled to IFS 126 via an adhesive. In various embodiments, housing 310 may be coupled to IFS 126 via a fastener. In various embodiments, housing 310 may be integrally formed with IFS 126 such as during a composite co-curing process. Housing 310 may encase a portion of retaining member 320. For example housing 310 may encase first end 326, second end 328, including lip 322 at proximal surface 316, and proximal surface 321 of retaining member 320.

Fastener 312 may extend from housing 310. In various embodiments, fastener 312 may extend in a radial direction (y-direction in FIG. 3A). Nut 314 may attach to fastener 312 to secure retaining member 320 to IFS 126. Nut 314 may retain first end 326 of retaining member 320 to IFS 126.

Retaining member 320 may comprise a recess 324. Fastener 312 may be located at recess 324. Recess 324 may be configured to prevent nut 314 from extending into bypass flow path B.

With reference to FIG. 3B, a perspective, cross-section view of linkage system 232 in a deployed position 294 (also referred to as a reverse thrust mode) as well as in a stowed position 292 (also referred to as a forward thrust mode) is illustrated, in accordance with various embodiments. An xyz-axes is provided for ease of illustration. First end 252 of link arm 256 may comprise an aperture (also referred to herein as a second aperture) 304. With momentary reference to FIG. 4, retaining member 320 may define an aperture (also referred to herein as a first aperture) 402. Pivot 330 may extend through aperture 402. Pivot 330 may be coupled to retaining member 320 via aperture 402. Pivot 330 may extend through aperture 304 of link arm 256. Link arm 256 may be pivotally coupled to retaining member 320 via pivot 330. In this regard, retaining member 320 may retain link arm 256 to housing 310. In this regard, fitting 200 may retain link arm 256 to IFS 126.

Retaining member 320 may define a cavity 342. In various embodiments, cavity 342 may comprise a high aspect ratio aperture. A high aspect ratio aperture may comprise an aperture having an aspect ratio greater than 1.5, and in various embodiments, an aspect ratio greater than 2, and in various embodiments, an aspect ratio greater than 3, wherein aspect ratio, in this regard, refers to the ratio of the width of cavity 342 (measured along the z-direction in the xz-plane) and the height of cavity 342 (measured along the x-direction in the xz-plane). First end 252 of link arm 256 may be located within cavity 342. In various embodiments, the aspect ratio of cavity 342 may be sized to accommodate rotation of link arm 256.

With respect to FIG. 4, elements with like element numbering, as depicted in FIG. 3A and FIG. 3B, are intended to be the same and will not necessarily be repeated for the sake of clarity.

Figure 4A:
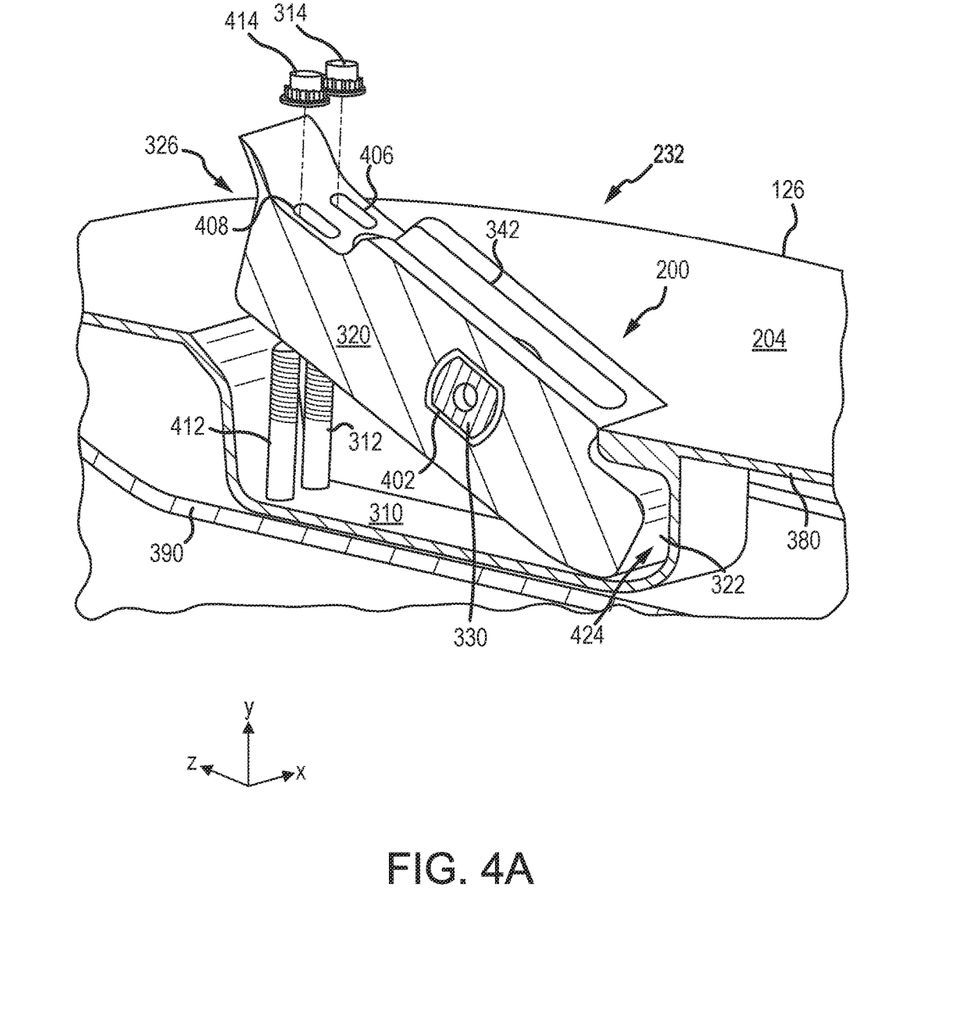
FIG. 4A illustrates a perspective view of a fitting being installed to an inner fixed structure (IFS), in accordance with various embodiments.
Figure 4B:
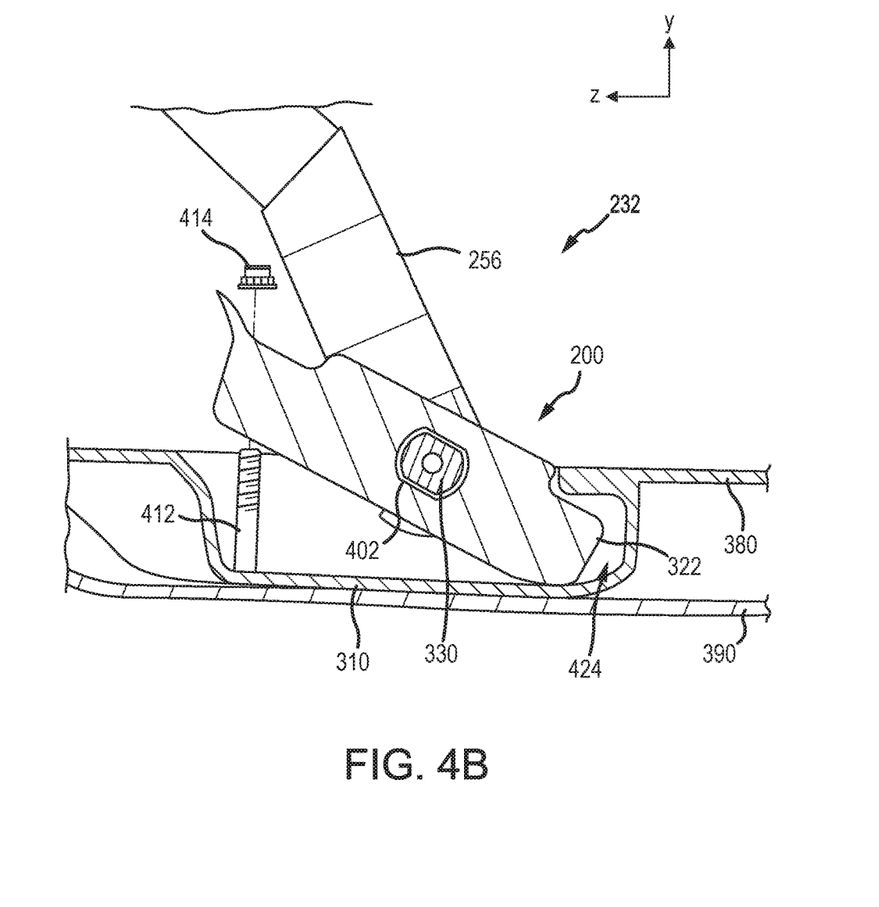
FIG. 4B illustrates a side view of a fitting being installed to an inner fixed structure (IFS), in accordance with various embodiments, in accordance with various embodiments.

With combined reference to FIG. 4A and FIG. 4B, a perspective view and a side view of retaining member 320 being installed into housing 310 are illustrated, respectively, in accordance with various embodiments. An xyz-axes and a yz-axes are provided for ease of illustration. Link arm 256 is not shown in FIG. 4A for clarity purposes. Housing 310 may form a pocket 424. Lip 322 may be placed underneath or radially inward of distal layer 380. Lip 322 may be placed into pocket 424.

Retaining member 320 may define an attachment aperture 406. Attachment aperture 406 may be placed over fastener 312. Similarly, retaining member 320 may define an attachment aperture 408. Attachment aperture 408 may be placed over fastener 412. Attachment aperture 408 may be similar to attachment aperture 406. Fastener 412 may be similar to fastener 312. Nut 314 may be threadingly coupled to fastener 312. Nut 414 may be threadingly coupled to fastener 412. Attachment aperture 406 and attachment aperture 404 may be located at first end 326 of retaining member 320. Attachment aperture 406 may comprise a high aspect ratio aperture. Attachment aperture 404 may comprise a high aspect ratio aperture. It is contemplated herein that similar arrangement of fasteners and nuts may be used instead of lip 322 at the forward end of retaining member 320.

Figure 6:
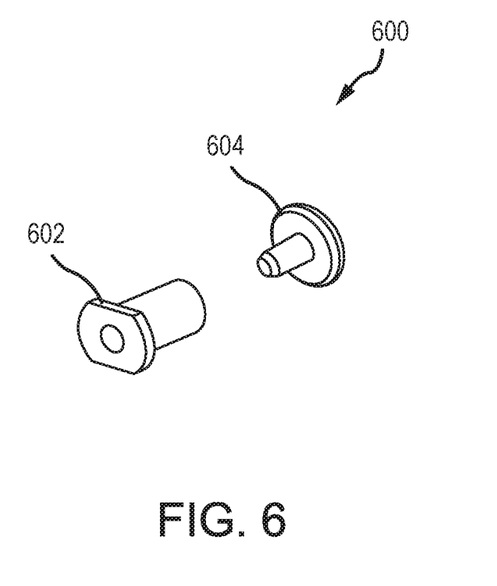
FIG. 6 illustrates a pivot comprising a first portion and a second portion, in accordance with various embodiments.

With reference to FIG. 6, a pivot 600 is illustrated, in accordance with various embodiments. Pivot 600 may be similar to pivot 330 of FIGS. 3A through 4B. Pivot 600 may comprise a first portion 602 and a second portion 604. The first portion 602 may be threadingly coupled to the second portion 604. In various embodiments, pivot 600 may comprise a bearing. In various embodiments, pivot 600 may comprise a rod, pin, or the like.

With combined reference to FIG. 3B and FIG. 4A, aperture 402 may extend in a direction substantially orthogonal to cavity 342. Aperture 304 may extend in a direction substantially orthogonal to cavity 342. Attachment aperture 406 and attachment aperture 408 may extend in a direction substantially orthogonal to aperture 402.

In various embodiments, fitting 200 may comprise a metal such as a steel alloy, stainless steel, titanium, aluminum, or any other metal. In various embodiments, fitting 200 may comprise a composite material. Pivot 330 may comprise steel or stainless steel. In various embodiments, pivot 330 may comprise aluminum. Pivot 330 may include a steel sleeve in response to pivot 330 comprising aluminum.

Figure 5:
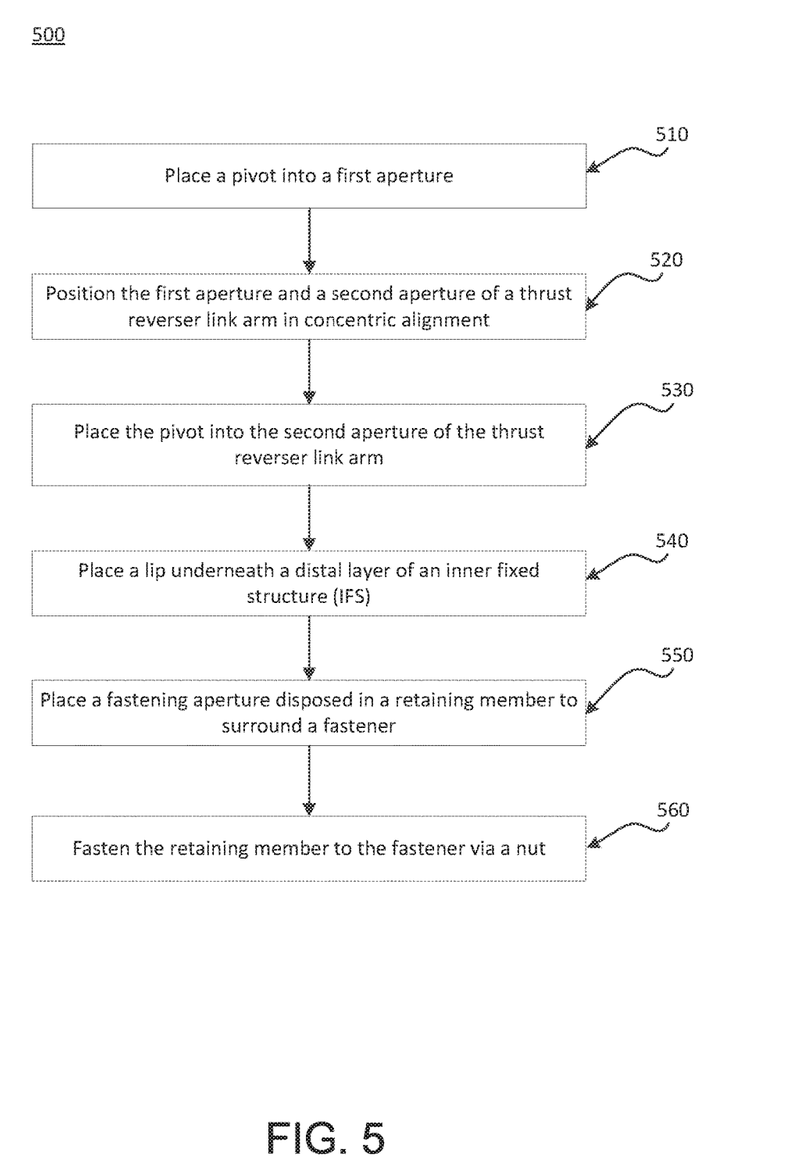
FIG. 5 illustrates a method of installing a linkage system to a nacelle, in accordance with various embodiments.

With reference to FIG. 5, a method 500 of installing a linkage system to a nacelle is provided, in accordance with various embodiments. Method 500 includes placing a pivot into a first aperture (step 510). Method 500 includes positioning the first aperture and a second aperture of a thrust reverser link arm in concentric alignment (step 520). Method 500 includes placing the pivot into the second aperture of the thrust reverser link arm (step 530). Method 500 includes placing a lip of a retaining member underneath a distal layer of an inner fixed structure (IFS) (step 540). Method 500 includes placing a fastening aperture disposed in a retaining member to surround a fastener (step 550). Method 500 includes fastening the retaining member to the fastener via a nut (step 560).

With combined reference to FIG. 3B, FIG. 4A, FIG. 4B, and FIG. 5, step 510 may include placing pivot 330 into first aperture 402. Step 520 may include positioning aperture 402 and aperture 304 of link arm 256 in concentric alignment. Step 530 may include placing pivot 330 into aperture 304 of link arm 256. Step 540 may include placing lip 322 of retaining member 320 underneath, or radially inwards of, distal layer 380 of IFS 126. Step 550 may include placing fastening aperture 406 disposed in retaining member 320 to surround fastener 312. Step 560 may include fastening retaining member 320 to fastener 312 via nut 314, as illustrated in FIG. 3B.

In various embodiments, method 500 may be performed without having to open the thrust reverser blocker door 228 (see FIG. 2B). In various embodiments, method 500 may be performed without having to access the core compartment 128 (see FIG. 1). In various embodiments, method 500 may be performed by accessing bypass flow path B (see FIG. 1).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A linkage system for a nacelle comprising:
   a pivot configured to extend through a second aperture disposed in a link arm;
   a retaining member having a first end and a second end and defining a first aperture and a cavity, wherein the pivot is configured to extend at least partially into the first aperture and the cavity is configured to accommodate a portion of the link arm, and
   wherein the retaining member comprises an attachment aperture located at the first end and a lip extending from the retaining member at the second end, the attachment aperture configured to receive a fastener, the fastener configured to receive a nut to secure the retaining member to an inner fixed structure (IFS), and the lip configured to be placed under a distal layer of the inner fixed structure (IFS), wherein the nut is accessible from a bypass flow path;
   a housing configured to encase a portion of the retaining member, the housing being coupled to the IFS and comprising a first portion radially inward of the retaining member and a second portion configured to cover the lip, the fastener extending from the housing.

2. The linkage system of claim 1, wherein the first end of the retaining member is configured to be attached to the IFS via the attachment aperture.

3. The linkage system of claim 2, wherein the lip is configured to prevent the second end of the retaining member from moving relative to the IFS.

4. The linkage system of claim 3, wherein the first aperture extends in a direction substantially orthogonal to the cavity.

5. The linkage system of claim 4, wherein the retaining member is configured to retain the link arm to the IFS.

6. The linkage system of claim 5, wherein the attachment aperture extends substantially orthogonal to the first aperture.

7. The linkage system of claim 6, wherein the cavity comprises a high aspect ratio aperture.

8. A nacelle for a gas turbine engine comprising:
   an inner fixed structure (IFS) comprising a proximal layer and a distal layer;
   a link arm having a first end and a second end, wherein a second aperture is disposed in the link arm at the first end, the link arm configured to rotate about the second aperture; and
   a fitting arrangement for the link arm comprising: a pivot extending through the second aperture;
   a retaining member having a first end and a second end and defining a first aperture and a cavity,
   wherein the pivot extends at least partially into the first aperture and at least a portion of the first end of the link arm is located within the cavity,
   wherein the retaining member comprises an attachment aperture located at the first end of the retaining member and a lip extending from the retaining member at the second end of the retaining member, the attachment aperture configured to receive a fastener, the fastener configured to receive a nut to secure the retaining member to the IFS, and the lip located under the distal layer of the IFS, and
   wherein the retaining member is disposed at least one of radially inward of the distal layer or flush with the distal layer, wherein the nut is accessible from a bypass flow path;
   a housing configured to encase a portion of the retaining member, the housing being coupled to the IFS and comprising a first portion radially inward of the retaining member and a second portion configured to cover the lip, the fastener extending from the housing.

9. The nacelle of claim 8, wherein the first end of the retaining member is attached to the IFS via the attachment aperture.

10. The nacelle of claim 9, wherein the lip prevents the second end of the retaining member from moving relative to the IFS.

11. The nacelle of claim 10, wherein the first aperture extends in a direction substantially orthogonal to the cavity.

12. The nacelle of claim 11, wherein the retaining member retains the link arm to the IFS.

13. The nacelle of claim 12, wherein the attachment aperture extends substantially orthogonal to the first aperture.

14. The nacelle of claim 13, wherein the cavity comprises a high aspect ratio aperture.

15. A method of installing a linkage system to a nacelle comprising:
   placing a pivot at least partially into a first aperture disposed in a retaining member;
   positioning the first aperture and a second aperture disposed in a thrust reverser link arm in concentric alignment;
   placing the pivot at least partially into the second aperture of the thrust reverser link arm;
   placing a lip underneath a distal layer of an inner fixed structure (IFS), the lip extending from the retaining member, the retaining member defining at least a portion of the first aperture and defining at least a portion of a cavity, at least a portion of the link arm being located within the cavity;
   placing a fastening aperture disposed in the retaining member to surround a fastener, the fastener being coupled to the IFS; and fastening the retaining member to the fastener via a nut, wherein the method is performed from a bypass flow path of the nacelle and the nut is accessible from the bypass flow path of the nacelle;
   a housing configured to encase a portion of the retaining member, the housing being coupled to the IFS and comprising a first portion radially inward of the retaining member and a second portion configured to cover the lip, the fastener extending from the housing.

16. The method of claim 15,
   wherein the nut is located radially inwards from a distal surface of the distal layer.

* * * * *